United States Patent [19]

Lumb et al.

[11] 3,723,382

[45] Mar. 27, 1973

[54] FRICTION MATERIALS

[75] Inventors: John B. Lumb, Bradford; Michael Edwards, Leeds, both of England

[73] Assignee: BBA Group Limited, Cleckheaton, Yorkshire, England

[22] Filed: Apr. 13, 1971

[21] Appl. No.: 133,765

[30] Foreign Application Priority Data

Apr. 15, 1970 Great Britain.....................17,965/70
Sept. 30, 1970 Great Britain.....................46,434/70

[52] U.S. Cl..............................260/38, 260/DIG. 39
[51] Int. Cl..........................C08g 51/04, C08g 51/10
[58] Field of Search .260/38, 39 M, DIG. 39; 106/36; 188/250, 251, 251 M, 251 A, 252

[56] References Cited

UNITED STATES PATENTS

| | | | |
|---|---|---|---|
| 2,252,991 | 8/1941 | Steck | 260/DIG. 39 |
| 3,402,054 | 9/1968 | Wood et al. | 106/36 |
| 2,110,571 | 3/1938 | Elerath | 260/DIG. 39 |
| 3,492,262 | 1/1970 | Griffith | 260/38 |

*Primary Examiner*—Lewis T. Jacobs
*Attorney*—Stevens, Davis, Miller & Mosher

[57] ABSTRACT

A friction material for friction braking or transmission systems including in its finished state a two-part binder system, one part being a phenolic thermosetting resin and the other part being uncombined nickel and sulphur. The nickel and sulphur are capable of reacting together under the action of heat generated during application of the system to form nickel sulphide which provides additional binding in the material and compensates for thermal decomposition of the resin. Friction modifiers and fillers may also be included.

8 Claims, No Drawings

FRICTION MATERIALS

This invention relates to friction materials of the kind (hereinafter referred to as "the kind specified") which are particularly intended for use in providing contact surfaces in friction braking or transmission systems such for example as used in disc brakes, internal shoe drum brakes, clutch facing, and railway brake blocks.

Hitherto such friction materials have usually consisted of mixtures of fibrous material, generally fibrous inorganic material, such as asbestos fiber, metallic and non-metallic fillers, binders, and friction modifiers, the mixture being moulded into a dense state by the application of heat and pressure.

Friction materials which are to be used in disc brakes are subjected to considerably higher temperatures and pressures than the material which is intended for use in drum brake installations, and consequently have higher rates of wear. Moreover, the higher temperatures can also lead to a thermal breakdown of the binder material, which causes the coefficient of friction of the material to decrease. The reduction in the coefficient of friction of the material, which sometimes occurs during heavy and continuous braking, is referred to as 'fade'.

According to the present invention there is provided a friction breaking or transmission system having a friction material of the kind specified for effecting braking or for transmitting power in which the friction material comprises a two-part binder system, one part comprising a thermosetting resin and the other part comprising a mixture of at least two materials which combine progressively under the action of heat developed as a result of frictional engagement of the friction material within the braking or transmission system to provide additional binding for the friction material.

Suitable materials which combine progressively under the action of such heat are nickel and sulphur.

According to another aspect of the invention therefore, there is provided a compacted friction material of the kind specified comprising finely divided nickel, sulphur and a binder comprising a thermosetting resin.

The invention further provides a compacted friction material of the kind specified including a binder which comprises a thermosetting resin part, and a further part which consists of nickel sulphide formed in situ from finely divided nickel and powdered sulphur.

This invention also includes a method of manufacturing a friction material comprising the steps of mixing together fibrous material, such as asbestos, finely divided nickel, sulphur and a thermosetting resin, compressing the mixture and heating the compressed mixture to a temperature sufficiently high to cure the thermosetting resin.

In one method in accordance with the invention the mixture is heated to a temperature sufficiently high to cure the thermosetting resin and to cause at least some of the finely divided nickel to combine with at least some of the sulphur to form nickel sulphide.

The thermosetting resins which may be incorporated in a friction material according to the invention may be an organic thermosetting resin, such as phenol formaldehyde, or an organic thermosetting resin which has been modified by the substitution of inorganic groups on to the organic molecule e.g. borated phenolic resins. Mixtures of different thermosetting resins of either type may also be used in a friction material according to the present invention.

The friction material may also contain a filler, which may be a metallic inclusion, such as brass powder, or a non-metallic filler, such as calcium carbonate powder, rottenstone or any other filler well-known in the art. Friction modifiers may also be incorporated in the friction material. These materials help to maintain the coefficient of friction at the desired level over varying temperature ranges. Thus, it may be necessary to increase the coefficient of friction, in which case abrasive friction modifiers such as alumina and/or carborundum powder can be incorporated in the material. On the other hand, if it is desired to reduce the coefficient of friction of the material, lubricative friction modifiers such as graphite or barytes (barium sulphate) may be added.

Our investigations have suggested that, in friction materials which incorporate only conventional thermosetting resin binders, the heat generated under heavy and prolonged braking is often sufficient to decompose the thermosetting resin on the contacting surfaces of the friction material, and this results in fade and high rates of wear. Our invention is based upon the development of a friction material for use in friction braking or transmission systems which friction material contains materials such as nickel and sulphur, which can react with each other under the action of heat developed as a result of the frictional engagement of the friction material within the system. The materials, when reacted, provide additional binding for the friction material and compensate for any deterioration in friction or wear characteristics of the friction material as a result of thermal decomposition of the thermosetting resin.

We have found that finely-divided nickel and sulphur are particularly suitable materials for incorporation in friction materials. These substances react together to form nickel sulphide when heated to a temperature such as is developed in friction braking or transmission systems as a result of prolonged application of the system. When the materials are incorporated in a friction material, the nickel sulphide generated by reaction of the nickel and sulphur forms a matrix which binds together the friction material and thereby prevents further deterioration of the friction material.

Friction materials incorporating nickel and sulphur may be manufactured by mixing finely divided nickel and sulphur, asbestos, or other inorganic fibrous material with a thermosetting resin, compressing the mixture, and heating the compressed mixture to a temperature sufficiently high to cure the resin e.g. between 120° and 180° C. Preferably, the heating is carried out in two stages, first by applying sufficient heat partly to cure the thermosetting resin whilst compressing the mixture, and subsequently heating the mixture after compression in order to complete the curing of the resin. After curing at these temperatures, the finished friction material will contain litter or no nickel sulphide. However, nickel sulphide will be formed from the nickel and the sulphur under the action of heat developed as a result of the frictional engagement of the friction material within the friction braking or transmission system.

An alternative manufacturing process, however, is to cure the compressed mixture at sufficiently high temperatures to effect reaction of the nickel and the sulphur, e.g. at temperatures in excess of 250° C., and preferably in the region of 300° C. In this case, the nickel and sulphur in the finished friction material will be wholly or substantially wholly present as nickel sulphide, and no further reaction will take place in the friction material when it is used.

In a preferred method of forming friction material according to the present invention inorganic fibrous material, fillers, thermosetting resin, finely divided nickel, sulphur and any desired friction modifiers are all intimately mixed together in a mixer or blending machine. A moulding operation is then carried out in which a mould, for example, a disc pad mould, is charged with the mixture. The mixture is then cured by the application of heat and pressure. Generally the curing time is in the order of five to ten minutes and the pressures which are applied to the mould are from one-half to 10 tons per square inch. It will be appreciated that the precise temperatures and pressures used in the moulding operation depend upon the relative quantities of the constituents of the friction material.

The initial application of heat and pressure causes the mixture partly to cure. The composition of the partly cured mixture depends upon the temperature and the length of time for which the mixture was cured. Thus, the temperature and curing period in the moulding operation may only be sufficiently high to initiate curing of the thermosetting resin. For example, the temperature on the face of the mould may be between 120° and 180° C. Alternatively, if higher temperatures are used, for example in excess of 250° C., combination of the finely divided nickel with the sulphur to form nickel sulphide may be initiated. The partly-cured mixture is then removed from the mould and heated in an oven sufficiently to complete the curing process. For example, the partly-cured mixture may be heated for 2 to 24 hours at a temperature of from 90° to 300° C. Depending on the temperature selected, the finished product will contain completely cured thermosetting resin, the nickel and sulphur being either uncombined or partly or completely combined as nickel sulphide.

An example of the ingredients (in parts by weight) from which friction material according to the present invention may be made is shown below:

| Ingredient | Parts by Weight |
| --- | --- |
| Asbestos fiber | 10–50 |
| Thermosetting resin | 5–30 |
| Nickel | 2–30 |
| Sulphur | 2–15 |
| Brass | 5–15 |
| Graphite | 2–10 |
| Alumina | 2–10 |
| Barytes | 5–25 |
| Calcium carbonate | 2–10 |

An example of friction material made according to the present invention is shown below:

| Ingredient | Parts by Weight |
| --- | --- |
| Asbestos fiber | 25 |
| Phenolic resin | 8 |
| Nickel | 15 |
| Sulphur | 6 |
| Brass powder | 10 |
| Graphite | 6 |
| Barytes | 24 |

The ingredients were weighted out and mixed together in a blending machine for 30 minutes. The materials were then charged into a disc brake pad mould, and moulded in a press at a temperature of 155° C. and at a pressure of 1 ton per square inch for 10 minutes. The material was then removed from the mould, placed in an oven and heated at a temperature of 180° C. for 10 hours.

The nickel and sulphur contained in the finished material were mainly present as the uncombined elements.

The materials were tested on an inertia dynamometer in order to investigate their wear characteristics as follows:

Two pads of the friction material each having an area of 5 square inches were used as brake pads in an automobile disc brake caliper, each pad being located on a respective side of a 10 inch diameter braking disc.

The material was subjected to a test schedule of 150 applications in which the rate of rotation of the disc was equivalent to road speeds of up to 80 m.p.h. Under these conditions kinetic energy of up to $40 \times 10^4$ ft lbf was dissipated. During part of the test torque was maintained at 400 lbf ft and during the remainder it varied between 100 and 600 lbf ft. The temperature measured on the face of the braking disc during the test schedule varied from ambient to 400° C. The average wear on each of the disc pads after the test schedule was 0.005 inches.

A conventional friction material based on asbestos and a thermosetting resin was subjected to an identical test schedule and the average wear on each of these disc pads was 0.030 inches.

We claim:

1. A compacted wear-resistant friction material for use in friction braking or transmission systems, the said friction material in its finished state comprising from 10 50 by weight of inorganic fibrous material in a two-part binder system, one part of said binder comprising 5 to 30 parts by weight of a phenolic thermosetting resin, and the other part of said binder comprising a mixture of 2 to 30 parts by weight of finely divided nickel and 2 to 15 parts by weight of powdered sulphur, the nickel and sulphur capable of progressively combining under the action of heat developed as a result of the frictional engagement of the friction material within the braking or transmission system to provide additional binding in the friction material.

2. A compacted wear-resistant friction material for use in friction braking or transmission systems, the said friction material in its finished state comprising from 10 to 50 parts by weight of an inorganic fibrous material, five to 30 parts by weight of phenolic thermosetting resin, two to 30 parts by weight of finely divided nickel and two to 15 parts by weight of powdered sulphur, substantially all of the nickel and the sulphur being uncombined, the uncombined nickel and sulphur capable of progressively combining with each other under the action of heat developed as a result of frictional engagement in the system to provide additional binding in the friction material.

3. A compacted wear-resistant friction material for use in friction braking or transmission systems, the said friction material in its finished state comprising from 10 50 parts by weight of an inorganic fibrous material, five to 30 parts by weight of phenolic thermosetting resin, two to 30 parts by weight of finely divided nickel and two to 15 parts be weight of powdered sulphur, a portion of the nickel and sulphur being combined in situ as nickel sulphide, and another portion of the nickel and sulphur being uncombined and capable of progressively combining with each other under the action of heat developed as a result of frictional engagement in the said system to provide additional binding in the friction material.

4. A material according to claim 2, containing 5 to 20 parts by weight of nickel.

5. A material according to claim 2 further including a friction modifier.

6. A material according to claim 2 further including a filler.

7. A material according to claim 2 wherein the phenolic thermosetting resin comprises at least one compound selected from the group consisting of phenol formaldehyde and borated phenol formaldehyde.

8. In a method wherein a friction material pad is engaged with a moving element of a friction braking or transmission systems which produces heat by friction, the improvement comprising: maintaining the frictional qualities of said friction material pad by utilizing a wear-resistant frictional material which comprises 10 to 50 parts by weight of inorganic fibrous material in a two-part binder system, one part of said binder comprising five to 30 parts by weight of a phenolic thermosetting resin, and the other part of said binder comprising a mixture of two to 30 parts by weight of finely divided nickel and two to 15 parts by weight of powdered sulphur, wherein at least a portion of said nickel and said sulphur are uncombined, whereby the frictional heat produced progressively combines the uncombined nickel and sulphur to produce additional binding in the frictional material during use.

* * * * *